United States Patent Office 3,356,822
Patented Dec. 5, 1967

3,356,822
CONTROL SYSTEMS
Clarence Bennett, Creve Coeur, Mo., assignor to Sperry Rand Corporation, a corporation of Delaware
Continuation of application Ser. No. 169,313, Jan. 29, 1962. This application May 2, 1966, Ser. No. 554,242
14 Claims. (Cl. 219—131)

ABSTRACT OF THE DISCLOSURE

An electric welder has an adjustable voltage A.C. power supply, an impedance that is non-conductive during the first parts of the half-cycles of the A.C. from that power supply but that can "fire" and become conductive before the ends of those half-cycles, and an adjustable inductance which limits the amount of current that can flow through that impedance and thus can permit early "firing" of that impedance without the increased welding current values normally corresponding to such early "firing."

Figure 1:
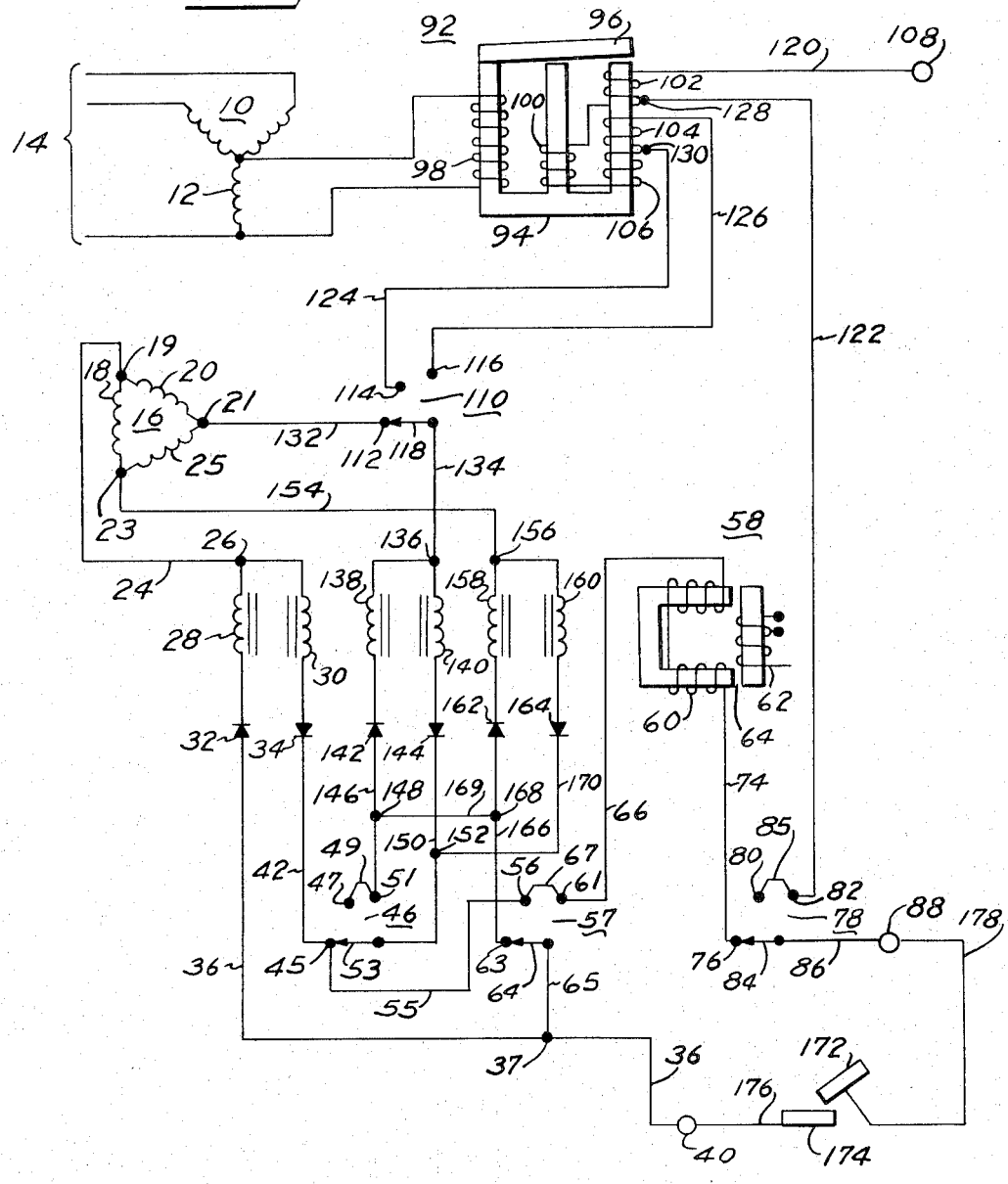

This is a continuation of patent application Ser. No. 169,313 for Control Systems that was filed Jan. 29, 1962, now abandoned.

This invention relates to improvements in control systems. More particularly, this invention relates to improvements in control systems for electric welders.

It is, therefore, an object of the present invention to provide an improved control system for electric welders.

It has been determined that in some types of electric arc welding, an A.C. welding current is needed to produce optimum results; whereas in other types of electric arc welding, a D.C. welding current is needed to produce optimum results. In recognition of this fact, some electric arc welders have been made which could be operated as D.C. arc welders to supply D.C. welding current or could be operated as A.C. arc welders to supply A.C. welding current. Those electric arc welders could be connected to a source of single phase A.C. and could use the rectifiers therein to provide the desired D.C. welding current or could by-pass those rectifiers to provide the desired A.C. welding current. While those electric arc welders are usable, they tend to cause unbalanced line loading where they are connected to one phase of a polyphase A.C. circuit. Specifically, if a number of those electric arc welders are connected to one phase of a three phase A.C. circuit, those electric arc welders will unbalance the line loading of that three phase A.C. circuit. Consequently it is customary, where a number of those electric arc welders are to be used in a shop or plant which has a polyphase A.C. circuit, to stagger those electric arc welders so each phase of the polyphase A.C. circuit supplies about the same number of electric arc welders. Such staggering of the electric arc welders is helpful; but it cannot prevent unbalancing of the polyphase A.C. circuit because not all of the electric arc welders will be in operation at any given moment. Further, such staggering of the electric arc welders cannot prevent unbalancing of the polyphase A.C. circuit because not all of the electric arc welders will be drawing the same amount of current at any given moment. It would be desirable to provide an electric arc welder which could be used as an A.C. arc welder or as a D.C. arc welder, and which could be used with a polyphase A.C. circuit without causing substantial unbalancing of the line loading of that circuit. The present invention provides such an electric arc welder; and it is, therefore, an object of the present invention to provide an electric arc welder which can be used as an A.C. arc welder or as a D.C. arc welder, and which can be used with a polyphase A.C. circuit without substantially unbalancing the line loading of that circuit.

When the electric arc welders, which have been made so they could be used either as A.C. arc welders or as D.C. arc welders, have been used as A.C. arc welders, the alternating currents flowing in the secondary windings of the transformers of those electric arc welders have, because of the tendency of welding arcs to act as rectifiers, occasionally become so unbalanced as to saturate the cores of those transformers. Any saturating of those cores is undesirable because it unduly limits the amounts of current which those electric arc welders can supply when those electric arc welders are used as A.C. arc welders. It would be desirable to provide an electric arc welder which could be used either as an A.C. arc welder or as a D.C. arc welder, and which could operate without saturation of the core of the transformer thereof, even though the alternating currents in the secondary winding of the transformer thereof were to become unbalanced when that electric arc welder was operated as an A.C. arc welder. The present invention provides such an electric arc welder; and it is, therefore, an object of the present invention to provide an electric arc welder which can be used either as an A.C. arc welder or as a D.C. arc welder and which can operate without saturation of the core of the transformer thereof, even if the alternating currents in the secondary winding of that transformer become unbalanced when that electric arc welder is operated as an A.C. arc welder.

The electric arc welder provided by the present invention includes a polyphase transformer; and it uses that transformer to supply the power which it uses, whether it is operated as a D.C. arc welder or as an A.C. arc welder. When that electric arc welder is operated as a D.C. arc welder, the various phases of the secondary winding of the polyphase transformer are connected together to form a polyphase bridge circuit; and this is desirable because that bridge circuit will enable the transformer to draw current from the polyphase supply circuit without unbalancing that supply circuit. Further, that connecting of the various phases of the secondary winding to form a polyphase bridge circuit is desirable because the D.C. output from such a bridge circuit requires minimal filtering reactance, and hence can have a wide range of dynamic characteristics. When the electric arc welder provided by the present invention is operated as an A.C. arc welder, only one phase of the secondary winding of the polyphase transformer thereof is used to supply the power to the welding arc; but that one phase will draw current from each of the phases of the primary winding of that transformer. As a result, the loading of the phases of the polyphase circuit, to which that electric arc welder is connected, can remain substantially balanced even though that electric arc welder is supplying single phase alternating current to the welding arc. Further, because the electric arc welder provided by the present invention utilizes a polyphase transformer to supply power when that electric arc welder is used as an A.C. arc welder, that electric arc welder can operate with little or no saturation of the core of the transformer thereof, even when the alternating currents flowing in the arc become unbalanced because of the tendency of that arc to act as a rectifier. The overall result is that the electric arc welder provided by the present invention can operate in a desirable manner, and without serious unbalancing of the polyphase supply circuit to which it is connected, whether it is operated as a D.C. arc welder or as an A.C. arc welder, because it utilizes a polyphase transformer. It is, therefore, an object of the present invention to provide an electric arc welder which can be used as a D.C. arc welder or as an A.C. arc welder and which utilizes a polyphase transformer.

One preferred embodiment of electric arc welder provided by the present invention utilizes saturable reactors to control the power supplied to the welding arc; and those saturable reactors control that power whether that electric arc welder is used as a D.C. arc welder or as an A.C. arc welder. The use of saturable reactors to control the power supplied to the welding arc is desirable because of the high gain and rugged nature of saturable reactors. However the use of saturable reactors in electric arc welders to control the power supplied to welding arcs has, heretofore, not been satisfactory where those electric arc welders have been operated adjacent the lower ends of their medium and low current ranges. It would be desirable to provide an electric arc welder which utilized a saturable reactor to control the power which it supplied to the welding arc, and which could operate satisfactorily throughout all portions of its current ranges. The present invention provides such an arc welder; and it is, therefore, an object of the present invention to provide an electric arc welder which utilizes a saturable reactor to control the power which it supplies to the welding arc, and which can operate satisfactorily throughout all portions of its current ranges.

To operate electric arc welders adjacent the lower ends of their medium and low current ranges it has been customary, where those electric arc welders utilized saturable reactors to control the power supplied to the welding arcs, to fire those saturable reactors just shortly before the ends of the half cycles of the supply voltages. Such firing limited the peak voltages applied to the welding arcs and thereby provided the desired low average current values. However, where the saturable reactors in electric arc welders, being operated in their medium or low current ranges, have been fired just shortly before the ends of the half cycles of the supply voltages, the welding arcs have tended to "go out" frequently; because the slopes of the output wave forms of saturable reactors incline sharply toward zero, just shortly before the ends of the half cycles of the supply voltages, and hence disturbances in the welding arcs or fluctuations in the line voltages could easily cause the peak voltages applied to the welding arcs to fall below the ionizing voltages of those arcs. Further, where the saturable reactors in electric arc welders, being operated in their medium or low current ranges, have been fired just shortly before the ends of the half cycles of the supply voltages, the welding arcs have tended to "go out" frequently; because the total "on" times of the saturable reactors have been so short that the arcs could cool sufficiently to de-ionize. The present invention makes it possible for an electric arc welder, that uses a saturable reactor to control the power supplied to the welding arc, to operate adjacent the lower ends of its medium and low current ranges without frequent arc "outages" by firing that saturable reactor during those portions of the half cycles of the supply voltage where the slopes of the output wave forms of that saturable reactor are not inclining sharply toward zero, and yet keeping the resulting high peak voltages from raising the average values of the welding currents. One preferred embodiment of the present invention uses an inductance in series with the output windings of the saturable reactor to permit firing of that saturable reactor during those portions of the half cycles of the supply voltage where the slopes of the output wave forms of that saturable reactor are not inclining sharply toward zero and yet keep the resulting high peak voltages from raising the average values of the welding currents. That inductance also helps the electric arc welder supply A.C. welding current in the lower ends of its medium and low current ranges without frequent "outages" by increasing the "on" time of the saturable reactor and thereby keeping the arc from cooling sufficiently to de-ionize. That inductance increases the "on" time of the saturable reactor in two ways: first, by permitting earlier firing of that saturable reactor, and, second, by keeping that saturable reactor conductive beyond the ends of the half cycles of the supply voltage. It is, therefore, an object of the present invention to provide an electric arc welder, which has a saturable reactor to control the power supplied to the welding arc, with an inductance in series with the output windings of that saturable reactor, and to fire that saturable reactor, whenever that electric arc welder is being operated adjacent the lower ends of its medium and low current ranges, during those portions of the half cycles of the supply voltage where the slopes of the output wave forms of that saturable reactor are not inclining sharply toward zero.

The inductance in the electric arc welder provided by the present invention will preferably be a variable inductance; because such an inductance can provide the large inductive impedance that is needed when that electric arc welder is used to supply A.C. welding current adjacent the low end of its low current range but can offer minimal inductive impedance when that electric arc welder is used to supply A.C. welding current in its high current range. Further, such an inductance can provide a moderate inductive impedance when that electric arc welder is used to supply A.C. welding current adjacent the lower end of its medium current range. It is, therefore, an object of the present invention to provide an electric arc welder with a saturable reactor and with a variable inductance in series with the output windings of that saturable reactor.

The electric arc welder provided by the present invention will preferably be able to supply different voltages to the circuit which includes the inductance plus the output windings of the saturable reactor of that electric arc welder. Where that is done, that circuit can be supplied with enough voltage to assure prompt and effective striking and re-striking of the arc when the electric arc welder is being used to supply A.C. welding current in its low range; and yet that circuit can be supplied with a sufficiently lower voltage, when that electric arc welder is being used to supply A.C. welding current in its high range, to avoid any need of an oversized saturable reactor. It is, therefore, an object of the present invention to provide an electric arc welder that is able to supply different voltages to the circuit which includes the inductance plus the output windings of the saturable reactor of that electric arc welder.

Other and further objects and advantages of the present invention should become apparent from an examination of the drawing and accompanying description.

In the drawing and accompanying description, two preferred embodiments of the present invention are shown and described but it is to be understood that the drawing and accompanying description are for the purpose of illustration only and do not limit the invention and that the invention will be defined by the appended claims.

Figure 2:
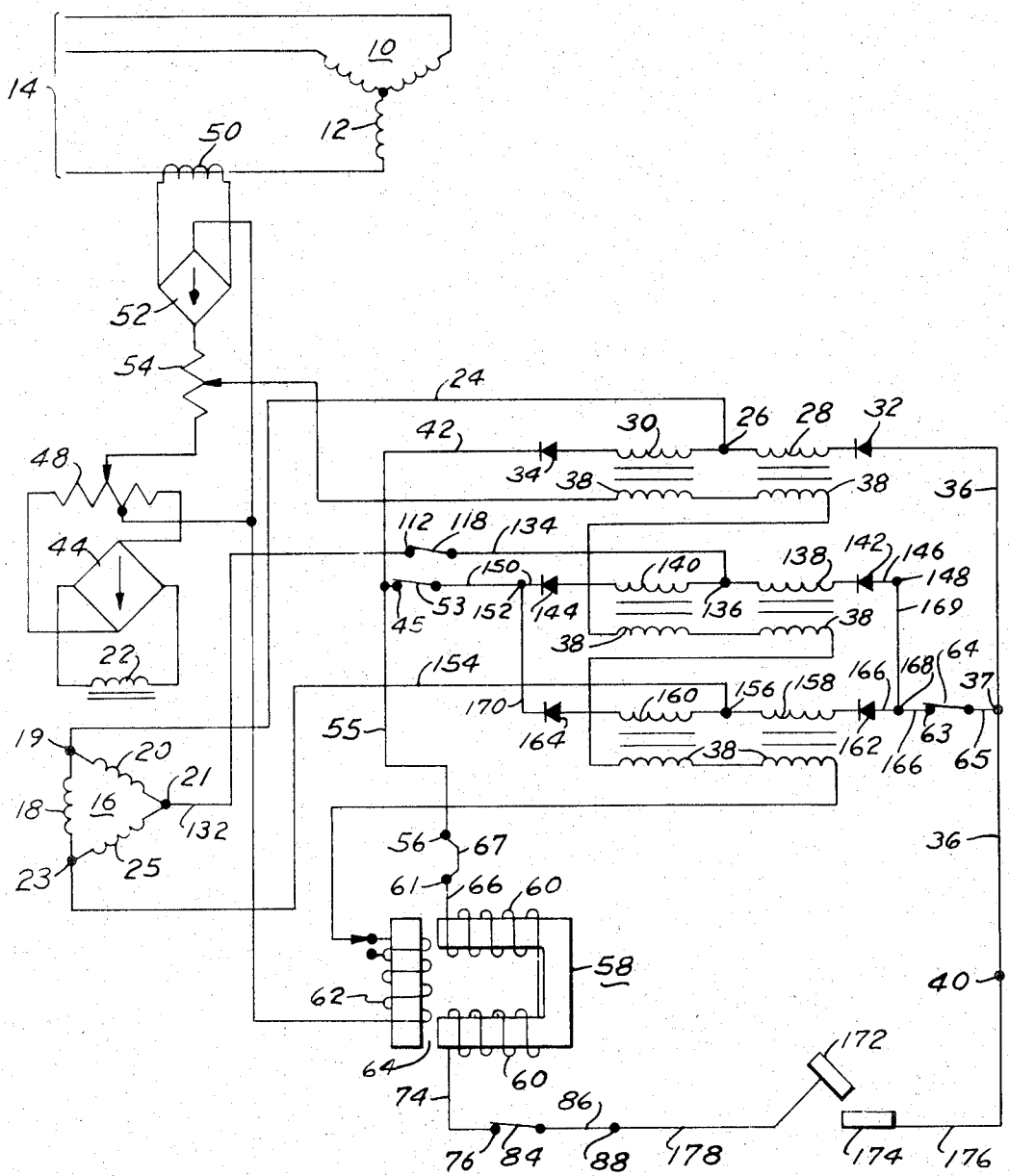
Figure 3:
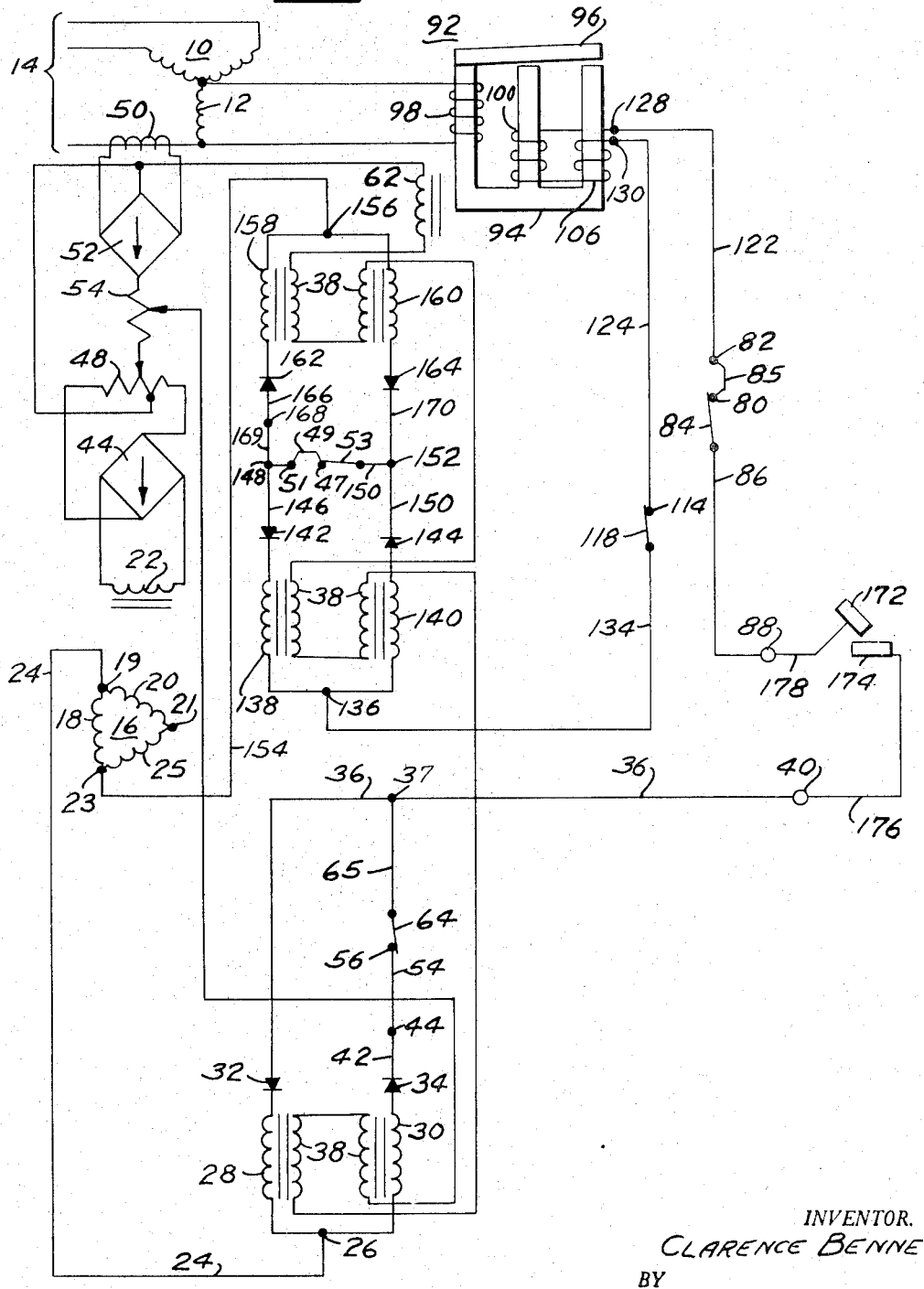
Figure 4:
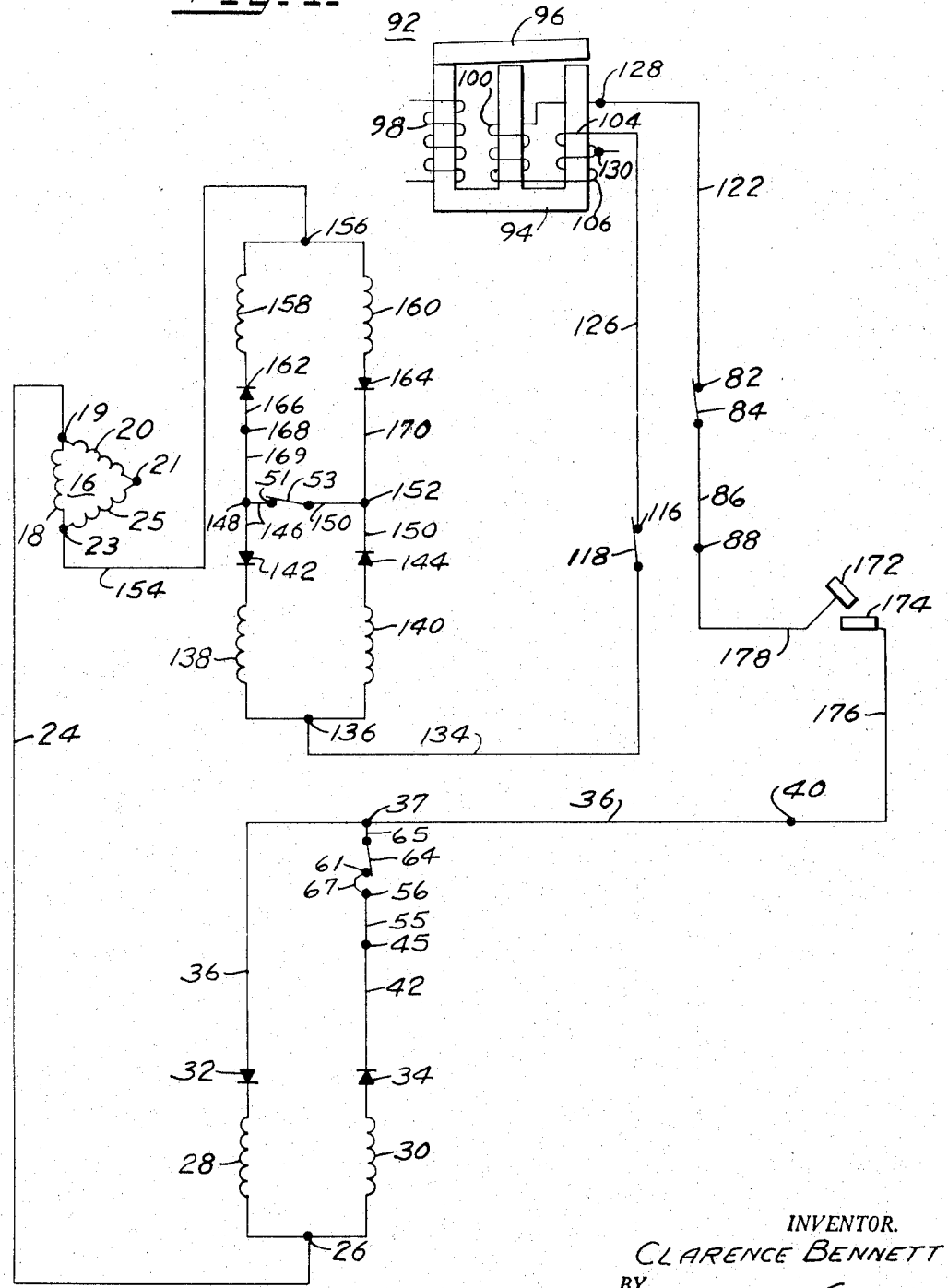
Figure 5:
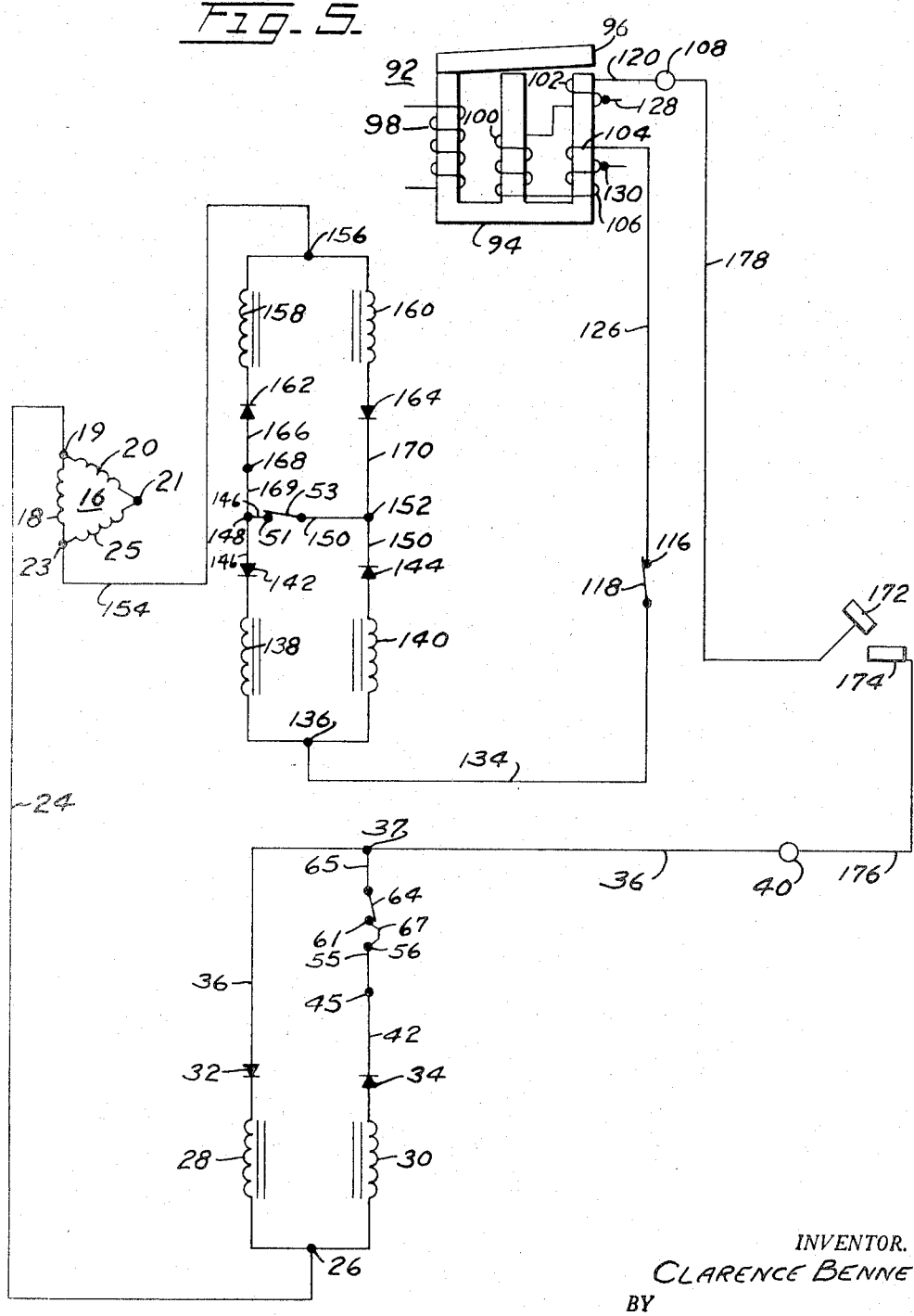
Figure 6:
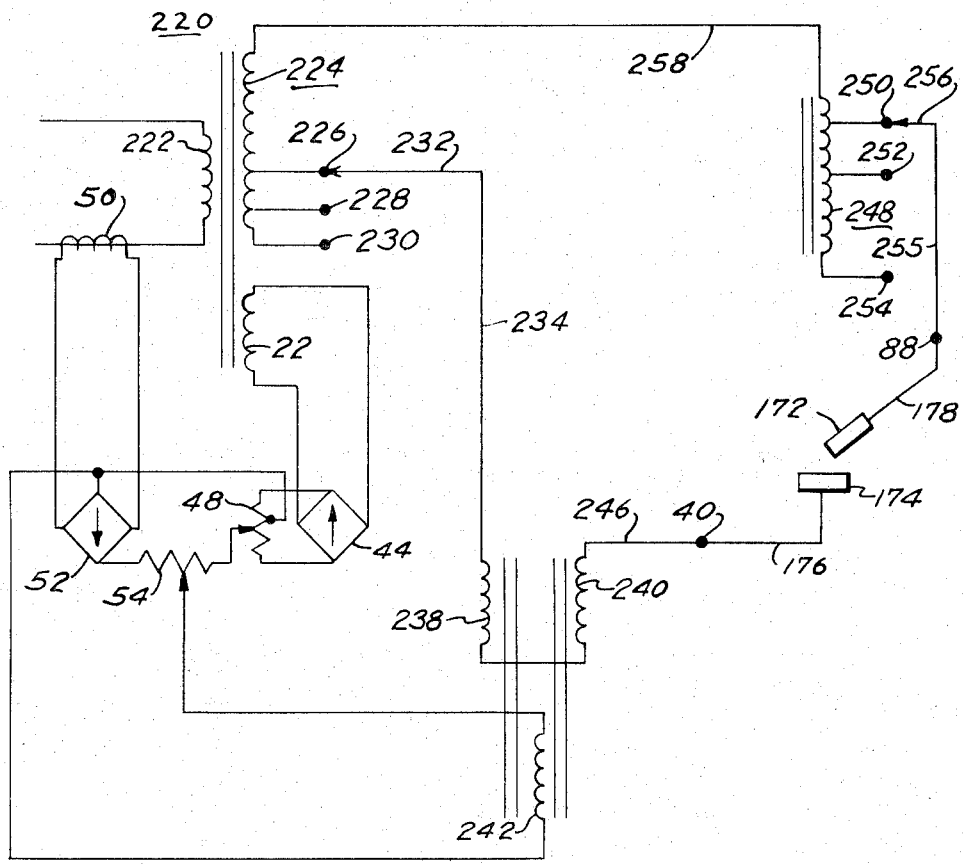

In the drawing: FIG. 1 is a schematic diagram of the circuit of one embodiment of electric arc welder that is made in accordance with the principles and teachings of the present invention, but that diagram does not show the bias and feed-back sub-circuits of that electric arc welder, FIG. 2 is a schematic diagram of those components of the circuit of FIG. 1 which are active when the electric arc welder is used as a D.C. welder, and it shows the bias and feed-back sub-circuits which are active when that electric arc welder is used as a D.C. arc welder, FIG. 3 is a schematic diagram of those components of the circuit of FIG. 1 which are active when the electric arc welder is used to supply A.C. welding current in the high range, and it shows the bias and feed-back sub-circuits which are active when that electric arc welder is used as an A.C. arc welder, FIG. 4 is a schematic diagram of those components of the circuit of FIG. 1 which are active when the electric arc welder is used to supply A.C. welding current in the medium range, but it does not show the bias and feedback sub-circuits which are active when that electric arc welder is used as an A.C. arc welder, FIG. 5 is a schematic diagram of those components of the circuit of FIG. 1 which are active when the electric arc welder is used to supply A.C. welding current in the low range, but it does not show the bias and feed-back sub-circuits which are active when that electric arc welder is used as an A.C. arc welder, and FIG. 6 is a schematic diagram of the circuit of another embodiment of electric arc welder that is made in accordance with the principles and teachings of the present invention.

Referring to the drawing in detail, the numeral 10 generally denotes the primary winding of a three phase transformer. The various coils of that primary winding are connected as a Y, and conductors 14 extend from the outer terminals of those coils to a suitable source of three phase A.C. power. One of the coils of the primary winding 10 is denoted by the numeral 12.

The numeral 16 generally denotes the secondary winding of the said three phase transformer, and the coils of that winding are connected in delta. Those coils are denoted by the numerals 18, 20 and 25; and the junction between one end of the coil 18 and one end of the coil 25 is denoted by the numeral 23, the junction between the other end of coil 25 and one end of the coil 20 is denoted by the numeral 21, and the junction between the other ends of the coils 20 and 18 is denoted by the numeral 19.

A conductor 24 extends between the junction 19 and a junction 26 which is connected to the upper ends of windings 28 and 30. The cathode of a diode 32 is connected to the lower end of the winding 28; and the anode of a diode 34 is connected to the lower end of the winding 30. The windings 28 and 30 are the output windings of a magnetic amplifier which includes the diodes 28 and 30. A conductor 36 extends from the anode of the diode 32 to a terminal 40, and that conductor has a junction 37 intermediate the ends thereof. The terminal 40 will extend to the exterior of the housing for the electric arc welder, and will be formed to accommodate one end of a flexible conductor 176 that is connectable to a work piece 174.

A conductor 42 extends from the cathode of the diode 34 to a fixed contact 45 of a switch 46. That switch is a three-position switch, and it has fixed contacts 47 and 51 in addition to the fixed contact 45. A movable contact 53 of that switch selectively engages each of the three fixed contacts 45, 47 and 51; and a jumper 49 permanently connects the contacts 47 and 51.

A conductor 55 extends from the fixed contact 45 to a fixed contact 56 of a switch 57. That switch is a three-position switch, and it has fixed contacts 61 and 63 in addition to the fixed contact 56. A movable contact 64 of that switch selectively engages each of the three fixed contacts 56, 61 and 63; and a jumper 67 permanently connects the contacts 56 and 61. A conductor 65 extends between the movable contact 64 and the junction 37 in the conductor 36.

A conductor 66 extends between the fixed contact 61 of switch 57 and the upper terminal of the primary winding 60 of a rate transformer 58 which will preferably be identical to the correspondingly-numbered rate transformer in Bennett et al. Patent No. 2,994,027 for Power Transmission which was granted July 25, 1961. The connections of the secondary winding 62 of the rate transformer 58 are shown in detail in FIG. 2 hereof.

A conductor 74 extends from the lower end of the primary winding 60 to a fixed contact 76 of a switch 78. That switch is a three-position switch, and it has fixed contacts 80 and 82 in addition to the fixed contact 76. The movable contact 84 of that switch selectively engages any one of the three fixed contacts 76, 80 and 82. A jumper 85 permanently connects the fixed contacts 80 and 82. A conductor 86 connects the movable contact 84 to a terminal 88; and that terminal will extend to the exterior of the housing for the electric arc welder, and will be formed to accommodate one end of a flexible conductor 178 which is connectable to a welding electrode 172.

The numeral 92 generally denotes a stabilizing transformer which has a core with an E-shaped portion 94 and an I-shaped portion 96. The I-shaped portion 96 of that core is set in register with the ends of the arms of the E-shaped portion 94 of that core; but the right-hand end of that I-shaped portion is spaced from the end of the right-hand arm of the E-shaped portion while the left-hand end of the I-shaped portion abuts the left-hand arm of that E-shaped portion. This is important because it provides a reluctance for the path between the center arm of the E-shaped portion 94 and the I-shaped portion 96 of the core which is smaller than the reluctance of the path between the right-hand arm of that E-shaped portion and that I-shaped portion of the core.

A winding 98 is wound on the left-hand arm of the E-shaped portion 94 of the core, and the ends of that winding are connected to the ends of the coil 12 of the primary winding 10 of the three-phase transformer. A winding 100 is wound on the center arm of the E-shaped portion 94 of the core; and three windings 102, 104 and 106 are wound on the right-hand arm of the E-shaped portion 94 of the core. The windings 104 and 106 are connected by a junction 130 and can, if desired, be wound as a tapped winding. Preferably, the numbers of turns in the windings 100 and 106 are equal; and it has been found advantageous to provide sixteen turns in each of those windings. Winding 104 can, advantageously, have eighteen turns; and winding 102 can, advantageously, have twenty-two turns. The lower end of the winding 100 is connected to the lower end of the winding 106, and the upper end of the winding 100 is connected to the lower end of the winding 102 by a junction 128. The upper end of the winding 102 is connected to a terminal 108 by a conductor 120; and that terminal will extend to the exterior of the housing for the electric arc welder, and will be formed to accommodate the said one end of the flexible conductor 178. In the drawing, the said one end of that flexible conductor is shown connected to the terminal 88; and that said one end will be so connected whenever the electric arc welder is used as a D.C. arc welder or is used to supply A.C. welding current in the high or in the medium current ranges. The said one end of conductor 178 will be connected to the terminal 108 whenever the electric arc welder is used to supply A.C. welding current in the low current range.

The numeral 110 denotes a three-position switch; and that switch has fixed contacts 112, 114 and 116 and a movable contact 118. A conductor 124 extends between the fixed contact 114 of the switch 110 and the junction 130 between the lower end of winding 104 and the upper end of winding 106. A conductor 126 extends between the fixed contact 116 of the switch 110 and the upper end of winding 104. A conductor 132 extends between the fixed contact 112 of the switch 110 and the junction 21 between the coils 20 and 25 of the secondary winding 16 of the three-phase transformer. The numeral 122 denotes a conductor which extends between the fixed contact 82 of the switch 78 and the junction 128. That conductor connects the lower end of winding 102 and the upper end of winding 100 to the stationary contact 82 of the switch 78.

The windings 100, 102, 104 and 106 are wound on the arms of the E-shaped portion 94 of the core of the stabilizing transformer 92 in such a way that the voltages induced in those windings by the winding 98 will be additive. Specifically the voltages induced in the windings 100 and 106 by the winding 98 will be additive whenever the conductors 122 and 124 connect just those two of the four windings to the welding electrode 172. Similarly, the voltages induced in the windings 100, 106 and 104 by the winding 98 will be additive whenever the conductors 122 and 126 connect just those three of the four windings to the welding electrode 172; and the voltages induced in the windings 102, 100, 106 and 104 by the winding 98 will be additive whenever the conductors 120 and 126 connect all four of those windings to the welding electrode 172. The windings 100, 102, 104 and 106 are also wound on the arms of the E-shaped portion 94 of the core so the flux lines generated by those windings, whenever welding current flows through them, will buck the flux lines supplied by the winding 98. For example, at a given instant when the flux lines supplied by the winding 98 are moving upwardly in the left-hand arm of the E-shaped portion 94 of the core, the flux lines generated by the winding 100 as welding current flows through it will be moving upwardly through the center arm of that E-shaped portion, and the flux lines generated by welding current flowing through one or more of the windings 102, 106 and 104 will be moving upwardly in the right-hand arm of the E-shaped portion 94. In addition, the windings 102, 106 and 104 are wound on the right-hand arm of the E-shaped portion 94 of the core so that whenever one or more of those windings is conducting welding current, the resulting flux lines will also buck the flux lines generated in the center arm of that E-shaped portion by the passage of welding current through the winding 100.

The numeral 134 denotes a conductor which extends between the movable contact 118 of the switch 110 and a junction 136 which is connected to the upper ends of windings 138 and 140. The lower end of the winding 138 is connected to the cathode of a diode 142 and the lower end of the winding 140 is connected to the anode of a diode 144. The anode of the diode 142 is connected to the fixed contact 51 of the switch 46 by a conductor 146, and that conductor has a junction 148 intermediate the ends thereof. A conductor 150 connects the cathode of the diode 144 with the movable contact 53 of the switch 46, and that conductor has a junction 152 intermediate the ends thereof. The windings 138 and 140 are the output windings of a second magnetic amplifier, and that magnetic amplifier includes the diodes 142 and 144.

A conductor 154 extends from the junction 23, between the coils 18 and 25 of the secondary winding 16 of the three-phase transformer, to a junction 156. That junction is connected to the upper ends of windings 158 and 160; and the lower end of the winding 158 is connected to the cathode of a diode 162 while the lower end of the winding 160 is connected to the anode of a diode 164. A conductor 166 extends between the anode of the diode 162 and the fixed contact 63 of the switch 57, and that conductor has a junction 168 intermediate the ends thereof. A conductor 169 extends from the junction 168 in the conductor 166 to the junction 148 in the conductor 146. A conductor 170 extends from the cathode of the diode 164 to the junction 152 in the conductor 150. The windings 158 and 160 are the output windings of a third magnetic amplifier, and that magnetic amplifier includes the diodes 162 and 164.

The movable contacts 53, 64, 84 and 118 of the three-position switches 46, 57, 78 and 110 are all connected together for conjoint movement. Further, those movable contacts are set so they are all in the same relative position. As a result, whenever the movable contact 53 is in engagement with the fixed contact 45, the movable contact 64 will engage the fixed contact 63, the movable contact 84 will engage the fixed contact 76, and the movable contact 118 will engage the fixed contact 112. Similarly, when the movable contact 53 engages the fixed contact 47, the movable contact 64 will engage the fixed contact 56, the movable contact 84 will engage the fixed contact 80, and the movable contact 118 will engage the fixed contact 114. Further, when the movable contact 53 engages the fixed contact 51, the movable contact 64 will engage the fixed contact 61, the movable contact 84 will engage the fixed contact 82, and the movable contact 118 will engage the fixed contact 116.

The embodiment of electric arc welder which is shown in FIGS. 1–5 can be used as a D.C. arc welder and can also be used as an A.C. arc welder. When used as a D.C. arc welder, that embodiment can provide a range of from six to four hundred amperes. When used as an A.C. arc welder, that embodiment can provide a low current range of from six to forty amperes, can provide a medium current range of from twenty to one hundred and forty amperes, and can provide a high current range of from one hundred to two hundred and fifty amperes. Whenever that embodiment of electric arc welder is to be used as a D.C. arc welder, the movable contacts of the switches 46, 57, 78 and 110 will be set in the positions shown by FIG. 1. With those settings of those movable contacts, the active components of that embodiment of electric arc welder will be interconnected as shown in FIG. 2.

Specifically, the windings 28 and 30 and the diodes 32 and 34 will be connected to form a self-saturating reactor doubler. Similarly, the windings 138 and 140 and the diodes 142 and 144 will be connected to form a self-saturating reactor doubler; and the windings 158 and 160 and the diodes 162 and 164 will be connected to form a self-saturating reactor doubler. The anodes of the diodes 32, 142 and 162 will all be connected to the terminal 40—conductor 36 connecting the anode of diode 32 to that terminal, conductors 146, 169 and 166, and contacts 63 and 64 and conductors 65 and 36 connecting the anode of diode 142 to that terminal, and conductor 166 and contacts 63 and 64 and conductors 65 and 36 connecting the anode of diode 162 to that terminal. The cathodes of the diodes 34, 144 and 164 will all be connected to the terminal 88—conductors 42, 55, 67 and 66, primary winding 60, conductor 74, contacts 76 and 84 and conductor 86 connecting the cathode of diode 34 to that terminal, conductor 150 and contacts 53 and 45 and conductors 55, 67 and 66 and primary winding 60 and conductor 74 and contacts 76 and 84 and conductor 86 connecting the cathode of diode 144 to that terminal, and conductors 170 and 150 and contacts 53 and 45 and conductors 55, 67 and 66 and primary winding 60 and conductor 74 and contacts 76 and 84 and conductor 86 connecting the cathode of diode 164 to that terminal. As a result, those various windings will be connected to form a three phase bridge circuit.

The three magnetic amplifiers have a total of six control windings 38; and those control windings will preferably be identical to the six similarly-numbered control windings of the said Bennett et al. patent. Further, those six control windings are connected in bias and feed-back sub-circuits which include the secondary winding 62 of the rate transformer 58, two potentiometers 48 and 54, a single-phase secondary winding 22 of the three-phase transformer, a current transformer 50, and two full wave bridge rectifiers 44 and 52. Those sub-circuits are disclosed in the said Bennett et al. patent, and they will provide the control action disclosed in that patent. That control action is not, per se, a part of the present invention.

The potentiometer 48 can be adjusted to adjust the amount of bias for the control windings 38. As a result, that potentiometer can be adjusted to establish the desired current levels within the D.C. range and within the high, medium and low A.C. ranges of the electric arc welder.

Whenever the embodiment of electric arc welder of FIGS. 1–5 is to be used to provide A.C. welding current in the high current range, the movable contact 53 will be set in engagement with the fixed contact 47, the movable contact 64 will be set in engagement with the fixed contact 56, the movable contact 84 will be set in engagement with the fixed contact 80, and the movable contact 118 will be set in engagement with the fixed contact 114. At such time, the three self-saturating reactor doublers will be connected in series with each other, with the welding arc, with the windings 100 and 106, and with the coil 18 of the secondary winding 16 of the three-phase transformer. FIG. 3 shows the connections of the embodiment of electric welder of FIGS. 1–5 when that electric welder is connected to provide A.C. welding current in the high current range.

After a welding arc has been struck, current will, during one half of the cycle of the voltage across the coil 18, flow through that coil via junction 23, conductor 154, junction 156, winding 160, diode 164, conductor 170, junction 152, conductor 150, contacts 53 and 47, conductor 49, contact 51, junction 148, conductor 146, diode 142, winding 138, junction 136, conductor 134, contacts 118 and 114, conductor 124, junction 130, windings 106 and 100, junction 128, conductor 122, contact 82, conductor 85, contacts 80 and 84, conductor 86, terminal 88, conductor 178, electrode 172, work piece 174, conductor 176, terminal 40, junction 37, conductor 36, diode 32, winding 28, junction 26, and thence through conductor 24 to the junction 19. On the next half cycle of that voltage, current will flow through the coil 18 via junction 19, conductor 24, junction 26, winding 30, diode 34, conductor 42, contact 45, conductor 55, contacts 56 and 64, conductor 65, junction 37, conductor 36, terminal 40, conductor 176, workpiece 174, electrode 172, conductor 178, terminal 88, conductor 86, contacts 84 and 80, conductor 85, contact 82, conductor 122, junction 128, windings 100 and 106, junction 130, conductor 124, contacts 114 and 118, conductor 134, junction 136, winding 140, diode 144, conductor 150, junction 152, conductor 150, contacts 53 and 47, conductor 49, contact 51, junction 148, conductor 169, junction 168, conductor 166, diode 162, winding 158, junction 156, and thence through conductor 154 to the junction 23. It will be noted that during each half cycle of the voltage across the coil 18, current flows through that coil and the windings 100 and 106.

Prior to the time an arc is struck, the coil 18 will provide a predetermined voltage between the junctions 19 and 23. Also prior to the time an arc is struck, the coil 12 of the primary winding 10 will cause current to flow through the winding 98 on the left-hand arm of the core of the stabilizing transformer 92; and that flow of current will cause voltages to be induced in the winding 100 on the center arm and in the winding 106 on the right-hand arm of that E-shaped portion. The voltage across the winding 100 and the voltage across the winding 106 will add to each other and to the voltage between the junctions 19 and 23. The voltage across the winding 100 will be larger than the voltage across the winding 106 because more of the flux lines from the winding 98 will flow through the center arm than through the right-hand arm of the E-shaped portion 94 of the core—the flux path through that center arm being shorter and having a smaller air gap than the flux path through that right-hand arm. Conveniently, the voltage across the winding 100 can be about eight volts, the voltage across the winding 106 can be about five volts, and the voltage between the junctions 19 and 23 can be about fifty seven volts. Such voltages provide a "no load" voltage of almost seventy volts for the electric arc welder.

When the electrode 172 is caused to engage the work piece 174, current will start to flow through the windings 160, 138 and 28 or through the windings 30, 140 and 158; and, very promptly, the three magnetic amplifiers will "fire." The resulting peak voltage will cause an arc to form; and A.C. welding current will flow. That current will cause the windings 100 and 106 to generate flux lines; and the flux lines from the winding 100 will buck the flux lines from the windings 98 and 106, and the flux lines from the winding 106 will buck the flux lines from the windings 98 and 100. While the flux lines from the windings 100 and 106 will buck the flux lines from the primary winding 98, the latter winding will draw sufficient additional current from the coil 12 to substantially maintain its initially developed voltage.

The amount of current that can be supplied to the arc in the high current range of the electric arc welder is, in part, determined by the inductive impedances of the windings 100 and 106 but is principally determined by the setting of the potentiometer 48. The inductive impedance of the winding 100 is not inconsiderable, and neither is the inductive impedance of the winding 106—the two inductive impedances being about equal. However, the flux lines supplied by those windings buck each other, and hence those windings can provide only a very small net inductive impedance. As a result the inductive impedances of those windings can not materially determine the amount of current that can be supplied to the arc in the high current range of the electric arc welder. The potentiometer 48 can, however, materially determine the amount of current that can be supplied to the arc in the high current range, because it controls the "firing" angles of the magnetic amplifiers, and thus controls both the peak voltages applied to the arc and the "on" times of the magnetic amplifiers during the half cycles of the supply voltage. As a result, the potentimeter 48 makes it possible to select any desired current value within the high current range.

When the potentiometer 48 is set to cause the magnetic amplifiers to "fire" just shortly before the ends of the half cycles of the supply voltage, as will be the case toward the lower end of the high current range, the slopes of the output wave forms of the magnetic amplifiers will incline sharply toward zero. However, frequent arc "outages" will not occur because the arc will be hot enough to resist de-ionization. Further, although the net inductive impedance of the windings 100 and 106 is small, that net inductive impedance does make it possible to "fire" the magnetic amplifiers at points during the half cycles of the supply voltage where the slopes of the output wave forms of the magnetic amplifiers do not incline as sharply toward zero as do the slopes of the output wave forms of magnetic amplifiers which are connected in purely resistive circuits. In addition, the net inductive impedance of the windings 100 and 106 will make it possible to provide some increase in the "on" times of the magnetic amplifiers without increasing the average value of the welding current. The overall result is that the electric arc welder provided by the present invention can operate satisfactorily throughout its entire high current range.

Whenever the embodiment of electric arc welder of FIGS. 1–5 is to be used to provide A.C. welding current in the medium current range, the movable contact 53 will be set in engagement with the fixed contact 51, the movable contact 64 will be set in engagement with the fixed contact 61, the movable contact 84 will be set in engagement with the fixed contact 82, and the movable contact 118 will be set in engagement with the fixed contact 116. At such time, the three self-saturating reactor doublers will be connected in series with each other, with the welding arc, with the windings 100, 106 and 104, and with the coil 18 of the secondary winding 16 of the three phase transformer. FIG. 4 shows the connections of the embodiment of electric welder of FIGS. 1–5 when that electric welder is connected to provide A.C. welding current in the medium current range.

After a welding arc has been struck, current will, during one half of the cycle of the voltage across the coil 18, flow through that coil via junction 23, conductor 154, junction 156, winding 160, diode 164, conductor 170, junction 152, conductor 150, contacts 53 and 51, conductor 146, junction 148, conductor 146, diode 142, winding 138, junction 136, conductor 134, contacts 118 and 116, conductor 126, winding 104, junction 130, windings 106 and 100, junction 128, conductor 122, contacts 82 and 84, conductor 86, terminal 88, conductor 178, electrode 172, work piece 174, conductor 176, terminal 40, junction 37, conductor 36, diode 32, winding 28, junction 26, and thence through conductor 24 to the junction 19. On the next half cycle of that voltage, current will flow through the coil 18 via junction 19, conductor 24, junction 26, winding 30, diode 34, conductor 42, contact 45, conductor 55, contact 56, conductor 67, contacts 61 and 64, conductor 65, junction 37, conductor 36, terminal 40, conductor 176, work piece 174, electrode 172, conductor 178, terminal 88, conductor 86, contacts 84 and 82, conductor 122, junction 128, windings 100 and 106, junction 130, winding 104, conductor 126, contacts 116 and 118, conductor 134, junction 136, winding 140, diode 144, conductor 150, junction 152, conductor 150, contacts 53 and 51, conductor 146, junction 148, conductor 169, junction 168, conductor 166, diode 162, winding 158, junction 156, and thence through conductor 154 to the junction 23. It will be noted that during each half cycle of the voltage across the coil 18, current flows through that coil and the windings 100, 106 and 104.

Prior to the time an arc is struck, the coil 18 will provide a predetermined voltage between the junctions 19 and 23. Also prior to the time an arc is struck, the coil 12 of the primary winding 10 will cause current to flow through the winding 98 on the left-hand arm of the E-shaped portion 94 of the core of the stabilizing transformer 92; and that flow of current will cause voltages to be induced in the winding 110 on the center arm and in the windings 106 and 104 on the right-hand arm of that E-shaped portion. The voltage across the winding 100 and the voltages across the windings 106 and 104 will add to each other and to the voltage between the junctions 19 and 23. The voltage across the winding 100 will be larger than the voltage across the winding 106 and will also be larger than the voltage across the winding 104 because more of the flux lines from the winding 98 will flow through the center arm than through the right-hand arm of the E-shaped portion 94 of the core—the flux path through that center arm being shorter and having a smaller air gap than the flux path through that right-hand arm. Conveniently, the voltage across the winding 100 can be about eight volts, the voltage across the winding 106 can be about five volts, the voltage across the winding 104 can be less than a volt larger than the voltage across the winding 106, and the voltage between the junctions 19 and 23 can be about fifty-seven volts. Such voltages provide a "no load" voltage of about seventy-five volts for the electric arc welder.

When the electrode 172 is caused to engage the work piece 174, current will start to flow through the windings 160, 138 and 28 or through the windings 30, 140 and 158; and, promptly, the three magnetic amplifiers will "fire." The resulting peak voltage will cause an arc to form; and A.C. welding current will flow. That current will cause the windings 100, 106 and 104 to generate flux lines; and the flux lines from the winding 100 will buck the flux lines from the windings 98, 106 and 104, and the flux lines from windings 106 and 104 will buck the flux lines from the windings 98 and 100. While the flux lines from the windings 100, 106 and 104 will buck the flux lines from the primary winding 98, the latter winding will draw sufficient additional current from the coil 12 to substantially maintain its initially developed voltage.

The amount of current that can be supplied to the arc in the medium current range of the electric arc welder is determined by the inductive impedances of the windings 100, 106 and 104 and by the setting of the potentiometer 48. The inductive impedance of the winding 104 is greater than that of the winding 100 and is also greater than that of the winding 106; and that inductive impedance adds to the inductive impedance of the winding 106. Consequently, although the flux lines supplied by the winding 100 buck the flux lines supplied by the windings 106 and 104, a substantial net inductive impedance will result.

That net inductive impedance is large enough and effective enough to reduce the high current range of from one hundred to two hundred and fifty amperes to the medium current range of from twenty to one hundred and forty amperes—and this, despite the fact that the electric arc welder has a higher "no load" voltage in the medium current range than it has in the high current range. The selection of any particular current value in the medium current range can be effected by adjusting the potentiometer 48; because that potentiometer controls the "firing" angles of the magnetic amplifiers, and thus controls both the peak voltages applied to the arc and the "on" times of the magnetic amplifiers during the half cycles of the supply voltage.

When the potentiometer 48 is to be set to cause the magnetic amplifier to supply the arc with a current value adjacent the lower end of the medium current range, that potentiometer will not have to be set to cause those magnetic amplifiers to "fire" just shortly before the ends of the half cycles of the supply voltage. Instead, that potentiometer can be set to cause those magnetic amplifiers to "fire" well in advance of the ends of the half cycles of the supply voltage, because the net inductive impedance provided by the windings 100, 106 and 104 will keep the large peak voltages resulting from the early "firing" of the magnetic amplifiers from raising the average welding current value. The early "firing" of the magnetic amplifiers prevents frequent "outages" of the arc because it renders the magnitudes of the peak voltages less susceptible to change due to arc disturbances or to fluctuations in the line voltage, as by causing those peak voltages to occur during those portions of the half cycles of the supply voltage where the slopes of the output wave forms of the magnetic amplifiers are not inclining sharply toward zero. Further, that early "firing" prevents frequent "outages" by increasing the "on" times of the magnetic amplifiers and thereby keeping the arc from cooling sufficiently to de-ionize. Yet, those increased "on" times and the higher peak voltages will not increase the average welding current value because of the substantial net inductive impedance provided by the windings 100, 106 and 104. The overall result is that the electric arc welder provided by the present invention can operate satisfactorily throughout its entire medium current range.

Whenever the embodiment of electric arc welder of FIGS. 1–5 is to be used to provide A.C. welding current in the low current range, the flexible conductor 178 will be disconnected from the terminal 88 and will be connected to the terminal 108. Further, the movable contact 53 will be set in engagement with the fixed contact 51, the movable contact 64 will be set in engagement with the fixed contact 61, the movable contact 84 will be set in engagement with the fixed contact 82, and the movable contact 118 will be set in engagement with the fixed contact 116. At such time, the three self-saturating reactor doublers will be connected in series with each other, with the welding arc, with the windings 102, 100, 106 and 104, and with the coil 18 of the secondary winding 16 of the three phase transformer. FIG. 5 shows the connections of the embodiment of electric welder of FIGS. 1–5 when that electric welder is connected to provide A.C. welding current in the low current range.

After a welding arc has been struck, current will, during one half of the cycle of the voltage across the coil 18, flow through that coil via junction 23, conductor 154, junction 156, winding 160, diode 164, conductor 170, junction 152, conductor 150, contacts 53 and 51, conductor 146, junction 148, conductor 146, diode 142, winding 138, junction 136, conductor 134, contacts 118 and 116, conductor 126, winding 104, junction 130, windings 106 and 100, junction 128, winding 102, conductor 120, terminal 108, conductor 178, electrode 172, work piece 174, conductor 176, terminal 40, conductor 36, junction 37, conductor 36, diode 32, winding 28, junction 26, and thence through conductor 24 to junction 19. On the next half cycle of that voltage, current will flow through the coil 18 via junction 19, conductor 24, junction 26, winding 30, diode 34, conductor 42, contact 45, conductor 55, contact 56, conductor 67, contacts 61 and 64, conductor 65, junction 37, conductor 36, terminal 40, conductor 176, work piece 174, electrode 172, conductor 178, terminal 108, conductor 120, winding 102, junction 128, windings 100 and 106, junction 130, winding 104, conductor 126, contacts 116 and 118, conductor 134, junction 136, winding 140, diode 144, conductor 150, junction 152, conductor 150, contacts 53 and 51, conductor 146, junction 148, conductor 169, junction 168, conductor 166, diode 162, winding 158, junction 156, and thence through the conductor 154 to the junction 23. It will be noted that during each half cycle of the voltage across the coil 18, current flows through that coil and the windings 102, 100, 106 and 104.

Prior to the time an arc is struck, the coil 18 will provide a predetermined voltage between the junctions 19 and 23. Also prior to the time an arc is struck, the coil 12 of the primary winding 10 will cause current to flow through the winding 98 on the left-hand arm of the E-shaped portion 94 of the core of the stabilizing transformer 92; and that flow of current will cause voltages to be induced in the winding 100 on the center arm and in the windings 102, 106 and 104 on the right-hand arm of that E-shaped portion. The voltage across the winding 100 and the voltages across the windings 102, 106 and 104 will add to each other and to the voltage between the junctions 19 and 23. The voltage across the winding 100 will be larger than the voltage across the winding 106, will be larger than the voltage across the winding 104, and will also be larger than the voltage across the winding 102 because more of the flux lines from the winding 98 will flow through the center arm than through the right-hand arm of the E-shaped portion 94 of the core—the flux path through that center arm being shorter and having a smaller air gap than the flux path through that right-hand arm. Conveniently, the voltage across the winding 100 can be about eight volts, the voltage across the winding 106 can be about five volts, the voltage across the winding 104 can be less than a volt larger than the voltage across the winding 106, and the voltage across the winding 102 can be about six volts, and the voltage between the junctions 19 and 23 can be about fifty-seven volts. Such voltages provide a "no load" voltage of about eighty-one volts for the electric arc welder.

When the electrode 172 is caused to engage the work piece 174, current will start to flow through the windings 160, 138 and 28 or through the windings 30, 140 and 158; and, soon, the three magnetic amplifiers will "fire." The resulting peak voltage will cause an arc to form, and A.C. welding current will flow. That current will cause the windings 102, 100, 106 and 104 to generate flux lines; and the flux lines from the winding 100 will buck the flux lines from the windings 98, 102, 106 and 104, and the flux lines from the windings 102, 106 and 104 will buck the flux lines from the windings 98 and 100. While the flux lines from the windings 100 and 102, 106 and 104 will buck the flux lines from the primary winding 98, the latter winding will draw sufficient additional current from the coil 12 to substantially maintain its initially developed voltage.

The amount of current that can be supplied to the arc in the low current range of the electric arc welder is determined by the inductive impedances of the windings 100, 102, 106 and 104 and by the setting of the potentiometer 48. The inductive impedance of the winding 102 is greater than that of the winding 104, and thus is greater than the inductive impedance of either of the windings 102 and 106; and that inductive impedance adds to the inductive impedances of the windings 106 and 104. Consequently, although the flux lines supplied by the winding 100 buck the flux lines supplied by the windings 102, 106 and 104, a large net inductive impedance will result.

That net inductive impedance is large enough and effective enough to reduce the high current range of from one hundred to two hundred and fifty amperes to the low current range of from six to forty amperes—and this, despite the fact that the electric arc welder has a higher "no load" voltage in the low current range than it has in the high current range. The selection of any particular current value in the low current range can be effected by adjusting the potentiometer 48; because that potentiometer controls the "firing" angles of the magnetic amplifiers, and thus controls both the peak voltages applied to the arc and the "on" times of the magnetic amplifiers during the half cycles of the supply voltage.

When the potentiometer 48 is to be set to cause the magentic amplifiers to supply the arc with a current value adjacent the lower end of the low current range, that potentiometer will not have to be set to cause those magnetic amplifiers to "fire" just shortly before the ends of the half cycles of the supply voltage. Instead, that potentiometer can be set to cause those magnetic amplifiers to "fire" well in advance of the ends of the half cycles of the supply voltage, because the net inductive impedance provided by the windings 102, 100, 106 and 104 will keep the large peak voltages resulting from the early "firing" of the magnetic amplifiers from raising the average welding current value. The early "firing" of the magnetic amplifiers prevents frequent "outages" of the arc because it renders the magnitudes of the peak voltages less susceptible to change due to arc disturbances or to fluctuations in the line voltage, as by causing those peak voltages to occur during those portions of the half cycles of the supply voltage where the slopes of the output wave forms of the magnetic amplifiers are not inclining sharply toward zero. Further, that early "firing" prevents frequent "outages" of the arc by increasing the "on" times of the magnetic amplifiers and thereby keeping the arc from cooling sufficiently to de-ionize. Yet, those increased "on" times and the higher peak voltages will not increase the average welding current value because of the large net inductive impedance provided by the windings 102, 100, 106 and 104. The overall result is that the electric arc welder provided by the present invention can operate satisfactorily throughout its entire low current range.

It will be noted that the windings 100, 102, 104 and 106 of the stabilizing transformer 92 perform dual functions—increasing the "no load" voltage of the electric arc welder and, after the welding current starts flowing, providing a net inductive impedance to limit the average value of the welding current and to increase the "on" times of the magnetic amplifiers. Further, it will be noted that those windings make it possible to vary the amounts by which the "no load" voltage is increased and also make it possible to vary the amounts of net inductive impedance in the electric arc welder. Moreover, it will be noted that as the additional windings 104 and 102 are connected in the welding circuit, the inductive impedance will increase more rapidly than will the "no load" voltage. For example when the winding 104 is connected into the circuit it provides fewer volts than does the winding 100, even though it has more turns, but it increases the net inductive impedance sufficiently to reduce the current range of from one hundred to two hundred and fifty amperes to from twenty to one hundred and forty amperes. Similarly when the winding 102 is connected into the circuit it provides fewer volts than does the winding 100, even though it has more turns, but it increases the net inductive impedance sufficiently to reduce the current range of from twenty to one hundred and forty amperes to from six to forty amperes. This desirable result is due to the fact that the voltage-inducing coupling between winding 98 and the windings 102, 104 and 106 is much looser than the voltage-inducing coupling between winding 98 and the winding 100; and is also due to the fact that the flux path for the flux lines which are generated by the flow of welding current through windings 102, 104 and 106, and which tend to buck the flux lines generated by the flow of welding current through the winding 100, has no higher reluctance than the flux path for the latter flux lines. The overall result is that the stabilizing transformer 92 helps stabilize the arcs in the lower portions of the high, medium and low current ranges of the electric arc welder of FIGS. 1–5, and thereby helps assure satisfactory welding throughout the entire high, medium and low current ranges of that electric arc welder.

The inclusion of a polyphase transformer in the electric arc welder of FIGS. 1–5 is desirable because it avoids any unbalancing of the polyphase A.C. circuit when that electric arc welder is operated as a D.C. arc welder and it avoids substantial unbalancing of that circuit when that electric arc welder is operated as an A.C. arc welder. Further, the inclusion of that polyphase transformer in the electric arc welder of FIGS. 1–5 is desirable because it avoids any saturation of the core of that transformer when that electric arc welder is operated as an A.C. arc welder.

In the electric arc welder of FIGS. 1–5, three magnetic amplifiers are used to provide a three phase bridge circuit when that electric arc welder is used as a D.C. arc welder; and those same magnetic amplifiers are serially connected when that electric arc welder is used as an A.C. arc welder. When an electric arc welder with fewer components is desired, one magnetic amplifier could be used to control the welding current.

Referring particularly to FIG. 6, the numeral 220 generally denotes a single phase transformer which has a primary winding 222 that can be suitably connected to a source of single phase A.C. The numeral 224 generally denotes the secondary winding of the transformer 220, and that secondary winding has three taps 226, 228, and 230. A movable contact 232 can be set in engagement with any one of those taps; and a conductor 234 extends from that movable contact to one of the serially-connected output windings 238 and 240 of a saturable reactor. That saturable reactor has a control winding 242. A conductor 246 extends between the other of the serially-connected windings 238 and 240 and a terminal 40. That terminal will extend to the exterior of the housing for the electric arc welder of FIG. 6, and will be formed to accommodate one end of a flexible conductor 176 which can be connected to a work piece 174. The numeral 172 denotes a welding electrode, and a flexible conductor 178 connects that welding electrode to a terminal 88. That terminal extends to the exterior of the housing for the electric arc welder of FIG. 6, and will be formed to receive one end of the flexible conductor 178. The numeral 248 denotes an inductance which has three taps 250, 252 and 254. A movable contact 256 is connected to the terminal 88 by a conductor 255, and that movable contact can be set in engagement with any one of the taps 250, 252 and 254. A conductor 258 connects the upper end of the inductance 248 with the upper end of the secondary winding 224.

The numeral 50 denotes the secondary winding of a current transformer, the numerals 44 and 52 denote full wave bridge rectifiers, the numerals 48 and 54 denote potentiometers, and the numeral 22 denotes a single phase secondary winding of the three phase transformer. Those components are identical to similarly-numbered components in the said Bennett et al. patent and in FIGS. 1–5 hereof; and they constitute parts of the bias and feedback sub-circuits for the electric arc welder of FIG. 6. One end of the control winding 242 is connected to the movable contact of the potentiometer 54 while the other end of that winding is connected to one of the output terminals of the bridge rectifier 52. The function and operation of the bias and feed-back sub-circuits of FIG. 6 are disclosed in the said Bennett et al. patent and are not, per se, part of the present invention.

The movable contacts 232 and 256 will preferably be connected for conjoint movement. Furthermore, those movable contacts will preferably be set in register with each other, so that whenever the movable contact 232 engages the tap 226 the movable contact 256 will engage the tap 250, so that whenever the movable contact 232 engages the tap 228 the movable contact 256 will engage the tap 252, and so that whenever the movable contact 232 engages the tap 230 the movable contact 256 will engage the tap 254.

Whenever the embodiment of electric arc welder of FIG. 6 is to be used to provide A.C. welding current in the high current range, the movable contact 232 will be set in engagement with the tap 226 of the secondary winding 224 and the movable contact 256 will be set in engagement with the tap 250 of the inductance 248. At such time, the serially-connected output windings 238 and 240 of the saturable reactor will be connected in series with the upper section of the secondary winding 224 and with the upper section of the inductance 248.

After a welding arc has been struck, current will, during one-half of the cycle of the voltage across the secondary winding 224, flow through the upper section of that secondary winding via conductor 258, the upper section of inductance 248, tap 250, movable contact 256, conductor 255, terminal 88, conductor 178, electrode 172, work piece 174, conductor 176, terminal 40, conductor 246, windings 240 and 238, conductor 234, movable contact 232, and tap 226. On the next half cycle of that voltage, current will flow through the upper section of the secondary winding 224 via tap 226, movable contact 232, conductor 234, windings 238 and 240, conductor 246, terminal 40, conductor 176, work piece 174, electrode 172, conductor 178, terminal 88, conductor 255, movable contact 256, tap 250, the upper section of inductance 248, and the conductor 258 to the upper end of the secondary winding 224. It will be noted that during each half cycle of the voltage across the secondary winding 224, current flows serially through the upper section of that secondary winding, the upper section of the inductance 248, and the windings 238 and 240.

Prior to the time an arc is struck, the upper section of the secondary winding 224 will provide a predetermined voltage, and that voltage will be larger than the ionizing voltage of the welding arc. Conveniently, that voltage can be about seventy volts.

When the electrode 172 is caused to engage the work piece 174, current will start to flow through the windings 238 and 240; and, very promptly, the saturable reactor will "fire." The resulting peak voltage will cause an arc to form, and A.C. welding current will flow. The amount of current that can be supplied to the arc in the high current range of the electric arc welder of FIG. 6 is determined by the inductive impedance of the upper section of the inductance 248 and by the setting of the potentiometer 48. The inductive impedance of the upper section of the inductance 248 will be rather small but it will help control the value of the welding current. The potentiometer 48 will materially affect the amount of current that can be supplied to the arc in the high current range of the electric arc welder of FIG. 6, because it controls the "firing" angle of the saturable reactor and thus controls both the peak voltages applied to the arc and the "on" times of the saturable reactor during the half cycles of the supply voltage. As a result, the potentiometer 48 makes it possible to select desired current values within the high current range.

When the potentiometer 48 is to be set to cause the electric arc welder to supply the arc with a current value adjacent the lower end of the high current range, that potentiometer will not have to be set to cause that saturable reactor to "fire" just shortly before the ends of the half cycles of the supply voltage. Instead, that potentiometer can be set to cause the saturable reactor to "fire" in advance of the ends of the half cycles of the supply voltage, because the inductive impedance provided by the upper section of inductance 248 will be large enough and effective enough to keep the larger peak voltages resulting from the early "firing" of the saturable reactor from raising the average welding current value. That early "firing" of the saturable reactor prevents frequent "outages" of the arc because it renders the magnitudes of the peak voltages less susceptible to change due to arc disturbances or to fluctuations in the line voltage, as by causing those peak voltages to occur in those portions of the half cycles of the supply voltage where the slopes of the output wave forms of the saturable reactor are not inclining sharply toward zero. Further, that early "firing" prevents frequent "outages" of the arc by increasing the "on" times of the saturable reactor and thereby keeping the arc from cooling sufficiently to de-ionize. Also, the inductive impedance provided by the upper section of the inductance 248 will additionally increase the "on" times of the saturable reactor by keeping that saturable reactor conductive for short periods of time after the ends of the half cycles of the supply voltage. The overall result is that the electric arc welder of FIG. 6 can operate satisfactorily throughout its entire high current range.

Whenever the embodiment of electric arc welder of FIG. 6 is to be used to provide A.C. welding current in the medium range, the movable contact 232 will be set in engagement with the tap 228 and the movable contact 256 will be set in engagement with the tap 252. At such time the reactor windings 238 and 240 will be connected in series with the two upper sections of the secondary winding 224 and with the two upper sections of the inductance 248.

After a welding arc has been struck, current will, during one -half of the cycle of the voltage across the secondary winding 224, flow through the two upper sections of that secondary winding via conductor 258, the two upper sections of inductance 248, tap 252, movable contact 256, conductor 255, terminal 88, conductor 178, electrode 172, work piece 174, conductor 176, terminal 40, conductor 246, windings 240 and 238, conductor 234, movable contact 232, and tap 228. On the next half cycle of that voltage, current will flow through the upper two sections of the secondary winding 224 via tap 228, movable contact 232, conductor 234, windings 238 and 240, conductor 246, terminal 40, conductor 176, work piece 174, electrode 172, conductor 178, terminal 88, conductor 255, movable contact 256, tap 252, the two upper sections of inductance 248, and conductor 258 to the upper end of secondary winding 224. It will be noted that during each half cycle of the voltage across the secondary winding 224, current flows serially through the two upper sections of that secondary winding, through the two upper sections of inductance 248, and through the windings 238 and 240.

Prior to the time an arc is struck, the two upper sections of the secondary winding 224 will provide a predetermined voltage; and that voltage will be higher than the voltage provided by the upper section of the secondary winding 224. Conveniently, the voltage supplied by the two upper sections of secondary winding 224 can be about seventy-five volts.

When the electrode 172 is caused to engage the work piece 174, current will start to flow through the windings 238 and 240; and, promptly, the saturable reactor will "fire." The resulting peak voltage will cause an arc to form, and A.C. welding current will flow. The amount of current that can be supplied to the arc in the medium current range of the electric arc welder of FIG. 6 is determined by the inductive impedance of the two upper sections of inductance 248 and by the setting of the potentiometer 48. The inductive impedance of the two upper sections of inductance 248 is large enough and effective enough to reduce the high current range to a medium current range of less than one-half the extent of the high current range—and this, despite the fact that the electric arc welder of FIG. 6 has a higher "no load" voltage in the medium current range than it has in the high current range. The selection of any particular current value in the medium current range can be effected by adjusting the potentiometer 48; because that potentiometer controls the "firing" angle of the saturable reactor, and thus controls both the peak voltages applied to the arc and the "on" times of the saturable reactor during the half cycles of the supply voltage. As a result, the potentiometer 48 makes it possible to select any desired current value within the medium current range.

When the potentiometer 48 is to be set to cause the electric arc welder to supply the arc with a current value adjacent the lower end of the medium current range, that potentiometer will not have to be set to cause that saturable reactor to "fire" just shortly before the ends of the half cycles of the supply voltage. Instead, that potentiometer can be set to cause the saturable reactor to "fire" well in advance of the ends of the half cycles of the supply voltage, because the inductive impedance provided by the two upper sections of inductance 248 will be large enough and effective enough to keep the larger peak voltages resulting from the early "firing" of the saturable reactor from raising the average welding current value. That early "firing" of the saturable reactor prevents frequent "outages" of the arc because it renders the magnitudes of the peak voltages less susceptible to change due to arc disturbances or to fluctuations in the line voltage, as by causing those peak voltages to occur in those portions of the half cycles of the supply voltage where the slopes of the output wave forms of the saturable reactor are not inclining sharply toward zero. Further, that early "firing" prevents frequent "outages" of the arc by increasing the "on" times of the saturable reactor and thereby keeping the arc from cooling sufficiently to de-ionize. Also, the inductive impedance provided by the two upper sections of inductance 248 will additionally increase the "on" times of the saturable reactor by keeping that saturable reactor conductive for short periods of time after the ends of the half cycles of the supply voltage. The overall result is that the electric arc welder of FIG. 6 can operate satisfactorily throughout its entire medium current range.

Whenever the embodiment of electric welder of FIG. 6 is to be used to provide A.C. welding current in the low current range, the movable contact 232 will be set in engagement with the tap 230 and the movable contact 256 will be set in engagement with the tap 254. At such time, the windings 238 and 240 of the saturable reactor will be connected in series with the secondary winding 224 and with inductance 248.

After a welding arc has been struck, current will, during one half of the cycle of the voltage across the secondary winding 224, flow through that secondary winding via conductor 258, inductance 248, tap 254, movable contact 256, conductor 255, terminal 88, conductor 178, electrode 172, work piece 174, conductor 176, terminal 40, conductor 246, windings 240 and 238, conductor 234, movable contact 232, and tap 230. On the next half cycle of that voltage, current will flow through the secondary winding 224 via tap 230, movable contact 232, conductor 234, windings 238 and 240, conductor 246, terminal 40, conductor 176, work piece 174, electrode 172, conductor 178, terminal 88, conductor 255, movable contact 256, tap 254, inductance 248 and conductor 258 to the upper end of secondary winding 224. It will be noted that during each half cycle of the voltage across the secondary winding 224, current flows serially through that secondary winding, through inductance 248, and through the windings 238 and 240.

Prior to the time an arc is struck, the secondary winding 224 will provide a predetermined voltage, and that voltage will be higher than the voltage provided by the two upper sections of the secondary winding 224. Conveniently, the voltage supplied by the secondary winding 224 can be about eighty volts.

When the electrode 172 is caused to engage the work piece 174, current will start to flow through the windings 238 and 240; and, soon, the saturable reactor will "fire." The resulting peak voltage will cause an arc to form, and A.C. welding current will flow. The amount of current that can be supplied to the arc in the low current range of the electric arc welded of FIG. 6 is determined by the inductive impedance of the inductance 248. That inductive impedance is large enough and effective enough to reduce the high current range to a low current range with an extent of less than one quarter that of the high current range—and this, despite the fact that the electric arc welder of FIG. 6 has a higher "no load" voltage in the low current range than it has in the high current range. The selection of any particular current value in the low current range can be effected by adjusting the potentiometer 48; because that potentiometer controls the "firing" angle of the saturable reactor, and thus controls both the peak voltages applied to the arc and the "on" times of the saturable reactor during the half cycles of the supply voltage.

When the potentiometer 48 is to be set to cause the electric arc welder to supply the arc with a current value adjacent the lower end of the low current range, that potentiometer will not have to be set to cause that saturable reactor to "fire" just shortly before the ends of the half cycles of the supply voltage. Instead, that potentiometer can be set to cause the saturable reactor to "fire" well in advance of the ends of the half cycles of the supply voltage, because the inductive impedance provided by the inductance 248 will be large enough and effective enough to keep the larger peak voltages resulting from the early "firing" of the saturable reactor from raising the average welding current value. That early "firing" of the saturable reactor prevents frequent "outages" of the arc because it renders the magnitudes of the peak voltages less susceptible to change due to arc disturbances or to fluctuations in the line voltage, as by causing those peak voltages to occur in those portions of the half cycles of the supply voltage where the slopes of the output wave forms of the saturable reactor are not inclining sharply toward zero. Further, that early "firing" prevents frequent "outages" of the arc by increasing the "on" times of the saturable reactor and thereby keeping the arc from cooling sufficiently to de-ionize. Also, the inductive impedance of the inductance 248 will additionally increase the "on" times of the saturable reactor by keeping that saturable reactor conductive for short periods of time after the ends of the half cycles of the supply voltage. The overall result is that the electric arc welder of FIG. 6 can operate satisfactorily throughout its entire low current range.

The electric arc welder of FIG. 6 differs from the electric arc welder of FIGS. 1–5 in that the former is supplied with single phase A.C. However, if desired, that electric arc welder could be supplied with polyphase A.C., as by making the secondary winding 224 one of the coils of the secondary winding of a polyphase transformer.

The electric arc welder of FIG. 6 also differs from the electric arc welder of FIGS. 1–5 in that the stabilizing transformer 92 of FIGS. 1–5 performs the dual functions of providing an adjustable voltage and of providing an adjustable inductance. The adjustable voltage and the adjustable inductance in the electric arc welder of FIG. 6 are, respectively, provided by the taps of the secondary winding 224 and by the taps of the inductance 248.

In addition, the electric arc welder of FIG. 6 additionally differs from the electric arc welder of FIGS. 1–5 in that it uses a saturable reactor rather than a magnetic amplifier. A magnetic amplifier is, however, merely a special form of saturable reactor; and in the electric arc welders of FIGS. 1–6, either saturable reactors or magnetic amplifiers could be used. Consequently, except where the context excludes a magnetic amplifier, the term saturable reactor is being used throughout to refer to a saturable reactor or a magnetic amplifier.

Magnetic amplifiers will preferably be used as the variable impedances which control the currents provided by the electric arc welders of the present invention; but, as indicated immediately hereinbefore, saturable reactors can be used. Further, other variable impedances which are initially non-conductive during each half cycle of the supply voltage and which subsequently "fire" during each of those half cycles could be used in place of the magnetic amplifiers or the saturable reactors.

The adjustable voltage provided by the stabilizing transformer 92 in FIGS. 1–5 and by the taps 226, 228 and 230 of the secondary winding 224 in FIG. 6 is desirable, because it provides peak voltages greater than the ionizing voltage throughout the entire low current ranges of the electric arc welders of FIGS. 1–6 despite the large inductive impedances used in those low current ranges, and yet avoids the need of oversized magnetic amplifiers or saturable reactors. However, where an oversized magnetic amplifier or saturable reactor is not objectionable, a fixed input voltage can be used as long as that voltage provides peak voltages greater than the ionizing voltage throughout the entire low current range of the electric arc welder.

In the stabilizing transformer 92 of FIGS. 1–5, flux paths with different reluctances were obtained by setting the I-portion at an angle to the plane defined by the ends of the arms of the E-portion. Flux paths with different reluctances could, however, be obtained in other ways. For example, a standard three-armed or three-legged core could be provided with an air gap in just that arm or leg on which the windings 102, 104 and 106 were mounted, or such a core could be made without an air gap but with a reduced cross section for that arm or leg on which the windings 102, 104 and 106 were mounted.

It is customary in the art of A.C. and D.C. arc welding to apply a radio frequency voltage across the welding electrodes and the work pieces to facilitate the striking and re-striking of the arcs; and hence the output of a radio frequency oscillator of the type customarily used in electric arc welding will preferably be connected across electrode 172 and the work piece 174 whether the electric arc welder is used as an A.C. or D.C. arc welder. One way of connecting that output across that electrode and that work piece is to connect that output to the primary winding of a transformer which has the secondary winding thereof connected between the terminal 40 and the conductor 176. Also, it is customary in the art of A.C. arc welding to connect a resistance-capacitance network across the output terminals of the electric arc welder. Consequently, whenever the electric arc welder is connected as an A.C. arc welder, a resistance-capacitance network will be connected across the terminals 40 and 88 or across the terminals 40 and 108. That resistance-capacitance network will preferably include a resistor that is connected in parallel with a series-connected capacitor and resistor.

Whereas the drawing and accompanying description have shown and described two preferred embodiments of the present invention, it should be apparent to those skilled in the art that various changes may be made in the form of the invention without affecting the scope thereof.

What I claim is:

1. An electric arc welder that has an adjustable voltage A.C. power supply, output terminals that are connectable to a welding load, an impedance that is non-conductive during the first parts of the half cycles of the A.C. from said power supply but that can "fire" and become conductive before the ends of said half cycles, an adjustable inductance, said impedance being connected to receive power from said power supply and to supply welding current to said output terminals, said inductance being connected into the circuit of said electric welder so as to limit the values of welding current which said impedance supplies to said output terminals, said inductance being adjustable to vary the inductance in said circuit of said electric welder and thereby enable said electric welder to provide a plurality of different welding current ranges, said inductance limiting the amount of current which can flow through said impedance and thereby permitting early "firing" of said impedance without the increased welding current values normally corresponding to such early "firing," said inductance coacting with said impedance to increase the "on" time of said impedance by keeping current flowing through said impedance for short periods of time after the ends of said half cycles, and contacts that are selectively connected to adjust said power supply and said inductance, said adjustable voltage A.C. power supply including a secondary winding of a polyphase A.C. transformer and secondary windings of a stabilizing transformer, said impedance being a magnetic amplifier, said adjustable inductance being said secondary windings of said stabilizing transformer and part of the core of said stabilizing transformer whereby said inductance is in said adjustable voltage A.C. power supply, said core of said stabilizing transformer having an E-shaped portion and an I-shaped portion with said I-shaped portion in register with the ends of the arms of said E-shaped portion but being inclined relative to said ends of said arms to provide air gaps of different lengths, a primary winding on that arm of said E-shaped portion of said core to which said I-shaped portion is closest, one of said secondary windings of said stabilizing transformer surrounding the center arm of said E-shaped portion of said core, a second of said secondary windings of said stabilizing transformer and other of said secondary windings of said stabilizing transformer surrounding the remaining arm of said E-shaped portion of said core, said secondary windings of said stabilizing transformer being wound to provide voltages that are additive to each other and to the voltage from said secondary winding of said polyphase transformer and also being wound so flux lines generated by the passage of welding current through said second and said other secondary windings of said stabilizing transformer will buck the flux lines generated by the passage of welding current through said one secondary winding of said stabilizing transformer, whereby the connecting of said other secondary windings of said stabilizing transformer in series with said one and said second of said secondary windings of said stabilizing transformer increases the inductive impedance of said electric arc welder proportionately greater than it increases the voltage of said power supply.

2. An electric welder that has an adjustable voltage A.C. power supply, output terminals that are connectable to a welding load, an impedance that is non-conductive during the first parts of the half cycles of the A.C. from said power supply but that can "fire" and becomes conductive before the ends of said half cycles, an adjustable inductance, said impedance being connected to receive power from said power supply and to supply welding current to said output terminals, said inductance being connected into the circuit of said electric welder so as to limit the values of welding current which said impedance supplies to said output terminals, said inductance being adjustable to vary the inductance in said circuit of said electric welder and thereby enable said electric welder to provide a plurality of different welding current ranges, said inductance limiting the amount of current which can flow through said impedance and thereby permitting early "firing" of said impedance without the increased welding current values normally corresponding to such early "firing," said inductance coacting with said impedance to increase the "on" time of said impedance by keeping current flowing through said impedance for short periods of time after the ends of said half cycles, and contacts that are selectively connected to adjust said power supply and said inductance, said adjustable voltage A.C. power supply including secondary windings of a stabilizing transformer, said adjustable inductance being said secondary windings of said stabilizing transformer and part of the core of said stabilizing transformer whereby said inductance is in said adjustable voltage A.C. power supply, said core of said stabilizing transformer having arms and having air gaps of different lengths, a primary winding on one arm of said core, one of said secondary windings of said stabilizing transformer surrounding a second arm of said core, a second of said secondary windings of said stabilizing transformer and other of said secondary windings of said windings of said stabilizing transformer surrounding a third arm of said core, said secondary windings of said stabilizing transformer being wound to provide voltages that are additive to each other and also being wound so flux lines generated by the passage of welding current through said second and said other secondary windings of said stabilizing transformer will buck the flux lines generated by the passage of welding current through said one secondary winding of said stabilizing transformer, whereby the connecting of said other secondary windings of said stabilizing transformer in series with said one and said second of said secondary windings of said stabilizing transformer increases the inductive impedance of said electric arc welder proportionately greater than it increases the voltage of said power supply.

3. An electric welder that has an adjustable voltage A.C. power supply, output terminals that are connectable to a welding load, an impedance that is non-conductive during the first parts of the half cycles of the A.C. from said power supply but that can "fire" and become conductive before the ends of said half cycles, an adjustable inductance, said impedance being connected to receive power from said power supply and to supply welding current to said output terminals, said inductance being connected into the circuit of said electric welder so as to limit the values of welding current which said impedance supplies to said output terminals, said inductance being adjustable to vary the inductance in said circuit of said electric welder and thereby enable said electric welder to provide a plurality of different welding current ranges, said inductance limiting the amount of current which can flow through said impedance and thereby permitting early "firing" of said impedance without the increased welding current values normally corresponding to such early "firing," and contacts that are selectively connected to adjust said power supply and said inductance, said adjustable voltage A.C. power supply including secondary windings of a stabilizing transformer, said adjustable inductance being said secondary windings of said stabilizing transformer and part of the core of said stabilizing transformer whereby said inductance is in said adjustable voltage A.C. power supply, said core of said stabilizing transformer having arms, a primary winding on one arm of said core, one of said secondary windings of said stabilizing transformer surrounding a second arm of said core, a second of said secondary windings of said stabilizing transformer and other of said secondary windings of said stabilizing transformer surrounding a third arm of said core, said secondary windings of said stabilizing transformer being wound to provide voltages that are additive to each other and also being wound so flux lines generated by the passage of welding current through said second and said other secondary windings of said stabilizing transformer will buck the flux lines generated by the passage of welding current through said one secondary winding of said stabilizing transformer.

4. An electric welder that has an adjustable voltage A.C. power supply, output terminals that are connectable to a welding load, an impedance that is non-conductive during the first parts of the half cycles of the A.C. from said power supply but that can "fire" and become conductive before the ends of said half cycles, and adjustable inductance, said impedance being connected to receive power from said power supply and to supply welding current to said output terminals, said inductance being connected into the circuit of said electric welder so as to limit the values of welding current which said impedance supplies to said output terminals, said inductance being adjustable to vary the inductance in said circuit of said electric welder and thereby enable said electric welder to provide a plurality of different welding current ranges, said inductance limiting the amount of current which can flow through said impedance and thereby permitting early "firing" of said impedance without the increased welding current values normally corresponding to such early "firing," and contacts that are selectively connected to adjust said power supply and said inductance, said adjustable voltage A.C. power supply including secondary windings of a stabilizing transformer, said adjustable inductance being said secondary windings of said stabilizing transformer and part of the core of said stabilizing transformer whereby said inductance is in said adjustable voltage A.C. power supply, said secondary windings of said stabilizing transformer being wound to provide voltages that are additive to each other and also being wound so flux lines generated by the passage of welding current through said second and said other secondary windings of said stabilizing transformer will buck the flux lines generated by the passage of welding current through said one secondary winding of said stabilizing transformer.

5. A stabilizing transformer for an electric welder that has a core, a primary winding on said core, and secondary windings on said core, said primary winding being connectable to a source of A.C. voltage so an A.C. voltage can be developed across said secondary windings, said secondary windings being connected so welding current flows through them, said core of said stabilizing transformer having an E-shaped portion and an I-shaped portion with said I-shaped portion in register with the ends of the arm of said E-shaped portion but being inclined relative to said ends of said arms to provide air gaps of different lengths, said primary winding surrounding that arm of said E-shaped portion of said core to which said I-shaped portion is closest, one of said secondary windings surrounding the center arm of said E-shaped portion of said core, a second of said secondary windings and other of said secondary windings surrounding the remaining arm of said E-shaped portion of said core, said secondary windings being wound to provide voltages that are additive to each other and also being wound so flux lines generated by the passage of welding current through said second and said other secondary windings of said stabilizing transformer will buck the flux lines generated by the passage of welding current through said one secondary winding of said stabilizing transformer, the flux path between said primary winding and said one secondary winding being shorter and having a smaller air gap than the flux path between said primary winding and said second and said other secondary windings but the path for the flux lines generated by the flow of welding current through said one and said second and said other secondary windings being the same, whereby the connecting of said other secondary windings in series with said one and said second of said secondary windings increases the inductive impedance of said electric arc welder proportionately greater than it increases the voltage.

6. A stabilizing transformer for an electric welder that has a core, a primary winding on said core, and secondary windings on said core, said primary winding being connectable to a source of A.C. voltage so an A.C. voltage can be developed across said secondary windings, said secondary windings being connected so welding current flows through them, said core of said stabilizing transformer having portions of different reluctance, said primary winding surrounding a portion of said core which has a relatively low reluctance, one of said secondary windings surrounding a second portion of said core which has a higher reluctance, a second of said secondary windings and other of said secondary windings surrounding a third portion of said core which has a still higher reluctance, said secondary windings being wound to provide voltages that are additive to each other and also being wound so flux lines generated by the passage of welding current through one of said secondary windings will buck the flux lines generated by the passage of welding current through said second secondary winding and through said other secondary windings, the flux path between said primary winding and said one secondary winding having a lower reluctance than the flux path between said primary winding and said second and said other secondary windings but the path for the flux lines generated by the flow of welding current through said one and said second and said other secondary windings being the same, whereby the connecting of said other secondary windings in series with said one and said second of said secondary windings increases the inductive impedance of said electric arc welder proportionately greater than it increases the voltage.

7. An electric welder that comprises an input which is connectable to a source of polyphase A.C., a polyphase transformer which has the primary winding thereof connected to said input, output terminals that are connectable to a welding load to supply power to said welding load, impedances that can be interposed between the secondary winding of said polyphase transformer and said output terminals to determine the power supplied to the welding load by said output terminals, and contacts that are selectively connectable to interconnect said impedances as a polyphase bridge and thereby cause said electric welder to operate as a D.C. welder or are connectable to connect said impedances in series and thereby cause said electric welder to operate as an A.C. welder, said secondary winding of said polyphase transformer drawing current from each phase of said primary winding whether said electric welder is being operated as a D.C. welder or as an A.C. welder, whereby said electric welder is operable as a D.C. welder or as an A.C. welder without substantial unbalancing of the line loading and said source of polyphase A.C.

8. An electric welder that comprises an input which is connectable to a source of polyphase A.C., a polyphase transformer which has the primary winding thereof connected to said input, output terminals that are connectable to a welding load to supply power to said welding load, impedances that can be interposed between the secondary winding of said polyphase transformer and said output terminals to control the power supplied to the welding load by said output terminals, and contacts that are selectively connectable to cause said electric welder to operate as a D.C. welder or as an A.C. welder, said impedances being connectable by said contacts to form a polyphase bridge circuit whenever said electric welder is operated as a D.C. welder, said impedances being connectable in series by said contacts whenever said electric welder is operated as an A.C. welder.

9. An electric welder that comprises an input which is connectable to a source of polyphase A.C., a polyphase transformer which has the primary winding thereof connected to said input, output terminals that are connectable to a welding load to supply power to said welding load, impedances that can be interposed between the secondary winding of said polyphase transformer and said output terminals to control the power supplied to the welding load by said output terminals, and contacts that are selectively connectable to interconnect said impedances as a polyphase bridge and thereby cause said electric welder to operate as a D.C. welder or are connectable to connect said impedances in series and thereby cause said electric welder to operate as an A.C. welder, said impedances and said polyphase transformer drawing polyphase A.C. from said source of polyphase A.C. and supplying either single phase D.C. or single phase A.C. to said output terminals.

10. An electric welder that comprises an input which is connectable to a source of polyphase A.C., a polyphase transformer which has the primary winding thereof connected to said input, output terminals that are connectable to a welding load to supply power to said welding load, variable impedances that can be interposed between the secondary winding of said polyphase transformer and said output terminals to control the power supplied to the welding load by said output terminals, and contacts that are selectively connectable to interconnect said impedances as a polyphase bridge and thereby cause said electric welder to operate as a D.C. welder or are connectable to connect said impedances in series and thereby cause said electric welder to operate as an A.C. welder, said variable impedances being non-conductive during the first parts of the half cycles of said polyphase A.C. but "firing" and becoming conductive before the ends of said half cycles of said polyphase A.C.

11. An electric welder that comprises an input which is connectable to a source of A.C., output terminals that are connectable to a welding load to supply A.C. power to said welding load, an impedance that is connectable to said source of A.C. and that is adapted to "fire" and become conductive to supply A.C. power to said output terminals, said impedance being nonconductive during the first parts of the half cycles of the A.C. from said source of A.C. but "firing" and becoming conductive before the ends of said half cycles of said A.C., and an inductance that has a plurality of windings thereon which respond to current flowing therethrough to develop flux lines that buck each other but which develop a net inductive impedance for said inductance, the bucking of said flux lines enabling said inductance to substantially limit the values of the current flowing through at least one of said plurality of windings, said impedance and at least said one of said plurality of windings on said inductance being connected in series between said input and said output terminals so the substantial limitation on the current flowing through said one of said plurality of windings on said inductance will enforce a corresponding limitation on the values of the current flowing through said impedance, the circuit of said electric welder permitting alternating current to flow through said inductance, said inductance being connected into said circuit of said electric welder so as to provide substantial inductance in said circuit and thereby limit the values of welding current which said impedance supplies to said output terminals, said inductance limiting the amount of current which can flow through said impedance and thereby making it possible to "fire" said impedance during those portions of said half cycles of said A.C. where the slopes of the output wave forms of said impedance are not inclining sharply towards zero without producing the increased welding current values normally corresponding to such "firing" and thereby limit the welding current to relatively low values.

12. An electric welder that comprises an input which is connectable to a source of A.C., output terminals that are connectable to a welding load to supply A.C. power to said welding load, an impedance that is connectable to said source of A.C. and that is adapted to "fire" and become conductive to supply A.C. power to said output terminals, said impedance being non-conductive during the first parts of the half cycles of the A.C. from said source of A.C. but "firing" and becoming conductive before the ends of said half cycles of said A.C., and an inductance that has a plurality of windings thereon which respond to current flowing therethrough to develop flux lines that buck each other but which develop a net inductive impedance for said inductance, the bucking of said flux lines enabling said inductance to substantially limit the values of the current flowing through at least one of said plurality of windings, said impedance and at least said one of said plurality of windings of said inductance being connected in series between said input and said output terminals so the substantial limitation on the current flowing through said one of said plurality of windings on said inductance will enforce a corresponding limitation on the values of the current flowing through said impedance, the circuit of said electric welder permitting alternating current to flow through said inductance, said inductance being connected into said circuit of said electric welder so as to provide a substantial inductance in said circuit and thereby limit the values of welding current which said impedance supplies to said output terminals, said inductance keeping current flowing through said impedance for short periods of time after the ends of said half cycles of said A.C. and thereby increasing the "on" time of said impedance.

13. An electric welder that comprises an input which is connectable to a source of A.C., output terminals that are connectable to a welding load to supply A.C. power to said welding load, an impedance that is connectable to said source of A.C. and that is adapted to become conductive to supply A.C. power to said output terminals, said impedance being non-conductive during the first parts of the half cycles of the A.C. from said source of A.C. but "firing" and becoming conductive before the ends of said half cycles of said A.C., and an inductance that can substantially limit the values of the current flowing through it, said inductance and said impedance being connected in series between said input and said output terminals, the circuit of said electric welder permitting alternating current to flow through said inductance, said inductance being connected into said circuit of said electric welder so as to provide substantial inductance in said circuit and thereby limit the values of welding current which said impedance supplies to said output terminals, said inductance limiting the amount of current which can flow through said impedance and thereby making it possible to "fire" said impedance during those portions of said half cycles of said A.C. where the slopes of the output wave forms of said impedance are not inclining sharply towards zero without producing the increased welding current values normally corresponding to such "firing" and thereby limit the welding current to relatively low values, said inductance being adjustable to materially vary the inductive impedance in said electric welder and thereby establish materially different current ranges for said electric welder.

14. An electric welder that comprises an input which is connectable to a source of A.C., output terminals that are connectable to a welding load to supply A.C. power to said welding load, an impedance that is connectable to said source of A.C. and that is adapted to become conductive to supply A.C. power to said output terminals, said impedance being non-conductive during the first parts of the half cycles of the A.C. from said source of A.C. but "firing" and becoming conductive before the ends of said half cycles of said A.C., and an inductance that can substantially limit the values of the current flowing through it, said inductance and said impedance being connected in series between said input and said output terminals, the circuit of said electric welder permitting alternating current to flow through said inductance, said inductance being connected into said circuit of said electric welder so as to provide substantial inductance in said circuit and thereby limit the values of welding current which said impedance supplies to said output terminals, said inductance limiting the amount of current which can flow through said impedance and thereby making it possible to "fire" said impedance during those portions of said half cycles of said A.C. where the slopes of the output wave forms of said impedance are not inclining sharply towards zero without producing the increased welding current values normally corresponding to such "firing" and thereby limit the welding current to relatively low values, said electric welder having means to adjust the values of A.C. voltage applied to said output terminals and said inductance being adjustable to increase the inductive impedance thereof, said inductance having the inductive impedance thereof increased at a rate proportionately greater than the rate at which said means increases the values of the A.C. voltage applied to said output terminals.

References Cited

UNITED STATES PATENTS

| | | | |
|---|---|---|---|
| 2,197,215 | 4/1940 | Holslag | 315—280 |
| 2,265,930 | 12/1941 | Scott | 315—141 |
| 2,310,886 | 2/1943 | Wentz | 323—61 |
| 2,825,004 | 2/1958 | Rebuffoni | 315—175 X |
| 2,880,374 | 3/1959 | Mulder | 315—175 X |
| 2,957,086 | 10/1960 | Pettit | 329—89 X |
| 3,199,016 | 9/1965 | Greene | 323—89 X |

ORIS L. RADER, *Primary Examiner.*

T. J. MADDEN, *Assistant Examiner.*